US012786218B2

(12) United States Patent
Sinha et al.

(10) Patent No.: US 12,786,218 B2
(45) Date of Patent: Nov. 3, 2026

(54) IDENTIFYING THREATS USING AGGREGATED SECURITY DATA AND TRAINED MODELS

(71) Applicant: MASTERCARD INTERNATIONAL INCORPORATED, Purchase, NY (US)

(72) Inventors: Vinit Sinha, Noida (IN); Amit Gupta, Dwark (IN); Harish Ashok Wadhwa, Thane (IN); Jaydeb Das, Parganas (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 113 days.

(21) Appl. No.: 18/648,201

(22) Filed: Apr. 26, 2024

(65) Prior Publication Data

US 2024/0364725 A1 Oct. 31, 2024

Related U.S. Application Data

(60) Provisional application No. 63/498,767, filed on Apr. 27, 2023.

(51) Int. Cl.

*G06F 21/00* (2013.01)
*H04L 9/40* (2022.01)

(52) U.S. Cl.

CPC ...... *H04L 63/1425* (2013.01); *H04L 63/0227* (2013.01)

(58) Field of Classification Search

CPC ............. H04L 63/1425; H04L 63/0227; H04L 63/1416

See application file for complete search history.

(56) References Cited

U.S. PATENT DOCUMENTS 10,986,117 B1 * 4/2021 Agbabian ........... G06F 21/6218
2017/0063889 A1 * 3/2017 Muddu ................ G06V 10/225
2017/0118245 A1 * 4/2017 Tcherchian ......... H04L 63/1416
2018/0124091 A1 * 5/2018 Sweeney ............. H04L 63/1433
2020/0280573 A1 * 9/2020 Johnson ................ G06F 21/316
2023/0018895 A1 * 1/2023 Murphy .................. G06F 21/56
2023/0109926 A1 * 4/2023 Nair ...................... G06F 21/567 726/25
2023/0153740 A1 * 5/2023 Meehan ........... G06Q 10/06395 705/7.41
2024/0114052 A1 * 4/2024 Karta .................. H04L 63/0245
2024/0155007 A1 * 5/2024 Gasiorek ............. H04L 63/1425

* cited by examiner

*Primary Examiner* — Michael M Lee
(74) *Attorney, Agent, or Firm* — Barta Jones, PLLC

(57) ABSTRACT

A computerized system and method for receiving security data from a plurality of security data sources, such as security tools, platforms, and/or other applications that are running in an enterprise system or other complex system is provided. The security data is then processed and analyzed to detect anomalous events and to automatically perform remedial operations in response to anomalous events. Security data from multiple sources is obtained. The security data is normalized such that it is compatible with a model trained for a use case. The model is used in combination with the normalized data to detect anomalous events and/or predict future security events associated with the use case of the model. Then, data associated with the detected anomalous events and/or predicted future security events are presented using a visualization layer and/or a remedial operation is performed.

20 Claims, 10 Drawing Sheets

200

200

400

IDENTIFYING THREATS USING AGGREGATED SECURITY DATA AND TRAINED MODELS

BACKGROUND

Modern enterprise systems are highly complex and gather large quantities of data that can be used in the detection and prevention of security events. However, in many systems, various types of data from various sources are maintained separately and stored in different formats. It is challenging to leverage all the different types of available data for security event detection and prevention based on these differences.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for receiving security data from a plurality of security data sources, such as security tools, platforms, and/or other applications that are running in an enterprise system or other complex systems is described. The security data is then processed and analyzed to detect anomalous events and to automatically perform remedial operations in response to anomalous events. A first group of security data is received from a first security data source and a second group of security data is received from a second security data source. The first group of security data and the second group of security data are normalized such that they are compatible with a model trained for a use case. The model is used in combination with the normalized data to detect anomalous events and/or predict future security events associated with the use case of the model. Then, data associated with the detected anomalous events and/or predicted future security events are presented using a visualization layer and/or a remedial operation is performed.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 7, the systems are illustrated as schematic drawings. The drawings may not be to scale. Any of the figures may be combined into a single example or embodiment.

DETAILED DESCRIPTION

Figure 1:
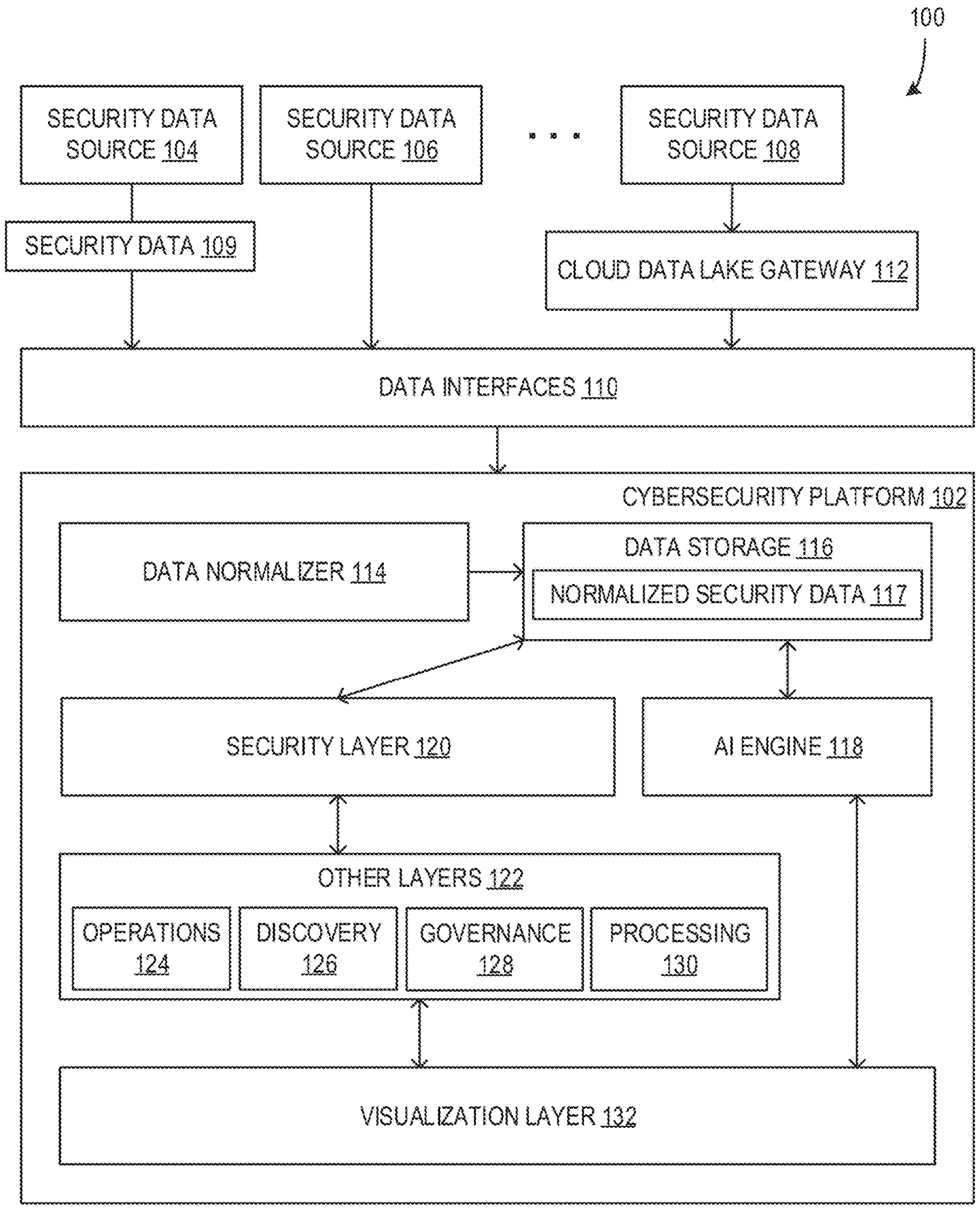
FIG. 1 is a block diagram illustrating a system configured for collecting, managing, and using aggregated security data to address security threats.

Aspects of the disclosure provide a system and method for receiving security data from a plurality of security data sources, such as security tools, platforms, and/or other applications that are running in an enterprise system or other complex system. The security data is gathered into a centralized cybersecurity platform and then it is normalized and/or parsed. The resulting normalized data is consistently scaled, formatted, and/or enriched, even though the raw data was received from a variety of different sources. The cybersecurity platform then analyzes the normalized data to detect or otherwise identify security issues in the system, such as anomalous events, security vulnerabilities, abnormal user behavior, and/or predicted future threats. The detection of these issues is done using an AI engine that includes a plurality of models trained for specific use cases. In response to detecting issues, the cybersecurity platform generates and presents data associated with the issues in a visualization layer (e.g., displaying a notification of an issue and/or data associated with the issue in a dashboard interface) and/or performs automatic remedial operations to address the issues (e.g., blocking network traffic, revoking user permissions, halting intrusive processes, or the like), as described herein.

The disclosure operates in an unconventional manner at least by gathering security data collected by a myriad of different tools or applications and normalizing the gathered security data in such a way that it can be analyzed together to generate more accurate and/or comprehensive insights about the system than any of those tools or applications can do alone. Cybersecurity intrusions and/or attacks have become more sophisticated over time, and, in some cases, they are designed to bypass some security tools while specifically avoiding raising any alarms in other tools. Because such tools tend to operate separately from each other, they cannot share and/or compare collected security data to prevent such intrusions. The disclosure addresses this issue by aggregating the security data from many different tools, normalizing and enriching the data to create useful security data features, and analyzing this comprehensive dataset to better detect and address such intrusions, attacks, and/or other issues.

Further, the disclosure improves the efficiency of resource use in the associated system, including use of data storage resources, use of network bandwidth resources, use of processing resources, and the like. Because the disclosure describes the collection of all available security data in a single platform and analysis of that comprehensive dataset in the single platform, the likelihood of duplicated processing efforts by other security tools or duplicate data transfers between other tools is reduced significantly. The disclosure enables flexible, centralized security data analysis such that reliance on analysis by other tools that might include duplicate resource usage can be reduced.

Additionally, the disclosure reduces the time and navigation effort required to observe a current security state of the system by providing data associated with the security state of the system in a comprehensive visualization layer using event notifications, statistical data dashboards, and the like. As previously described, the disclosure has access to data from a wide variety of security tools. The disclosure can be configured to display that data and/or any insights that are determined from that data in a variety of flexible interfaces that can all be accessed from within the described cybersecurity platform.

Further, the disclosure provides a centralized cybersecurity platform that can be integrated with many different security tools and that uses AI-powered models to detect and/or identify security issues. Through the use of such models, the disclosure provides proactive threat detection and risk mitigation in an efficient, centralized environment. Additionally, the disclosed platform enables the generation of versatile use cases that can be customized across any industries or domains.

The disclosure includes/enables the detection of anomalous events, such as suspicious login events, based on a plurality of data groups and the automatic presentation of those detected events to a user via a visualization layer GUI, such that the disclosure describes the integration of a process into a practical application. The disclosure describes the use of a model that is trained to detect specific types of anomalous events when provided normalized input data groups from a plurality of security data sources. This provides a specific improvement over prior systems because the normalization and analysis of data from the plurality of security data sources at one time by the trained model enables a more comprehensive analysis and provides more efficient, accurate detection of the anomalous events. Further, by analyzing the combined security data from the plurality of security data sources, the presentation of data about a detected event with the visualization layer GUI is improved by enabling comprehensive contextual information to be presented with the event data.

The disclosure enables the automatic presentation of anomalous event data on a visualization layer GUI and the movement, adjustment, or otherwise automatic alteration of the GUI in response to detected anomalous events, which requires action by a processor that cannot be practically applied in a mind. The disclosure uses a trained ML model to detect events associated with specific use cases based on normalized security data from a plurality of different security data sources, which cannot be practically performed in the human mind, at least because it requires a processor accessing computer memory that includes highly complex layers of the trained model and execution of those model layers using large quantities of diverse security data as input.

FIG. 1 is a block diagram illustrating a system 100 configured for collecting, managing, and using aggregated security data to address security threats. In some examples, the system 100 includes a cybersecurity platform 102 that collects or otherwise receives security data 109 from multiple security data sources 104-108 (e.g., via data interfaces 110). The cybersecurity platform 102 normalizes and/or otherwise preprocesses the received data using a data normalizer 114 and stores the normalized data in the data storage 116. An Artificial Intelligence (AI) engine 118 analyzes the stored data 117 using one or more trained models to generate security insight information that can be provided for display via the visualization layer 132 and/or used for other purposes. Additionally, or alternatively, the stored data from the data storage 116 is accessed and used by other layers 122 via a security layer 120. In some such examples, the other layers 122 include an operations layer 124, a discovery layer 126, a governance layer 128, and/or other processing layers 130. The operations of other layers 122 also produce information that is displayed via the visualization layer 132 as described herein.

Further, in some examples, system 100 includes one or more computing devices (e.g., the computing apparatus of FIG. 7) that are configured to communicate with each other via one or more communication networks (e.g., an intranet, the Internet, a cellular network, other wireless network, other wired network, or the like). In some examples, entities of system 100 are configured to be distributed between the multiple computing devices and to communicate with each other via network connections. In an example, cybersecurity platform 102 is located and/or executed on a first computing device while the security data source 104 is located on a second device in the system 100. The cybersecurity platform 102 and the device of the security data source 104 are then configured to communicate with each other via network connections as described herein. In other examples, the entities of the system 100 are organized and/or distributed across multiple computing devices in different ways without departing from the description.

In some examples, the group of security data sources 104-108 include one or more security products, tools, and/or applications that are each configured to provide specific security services and to collect or otherwise obtain data that pertains to those specific security services. Thus, each security data source 104, 106, and 108 includes sets of security data that differ with regard to what data they contain. Additionally, or alternatively, in some examples, the sets of data contained by at least two of the security data sources 104-108 include at least a portion of overlapping data entries (e.g., two security products that are configured to perform similar tasks use some of the same collected data to enable the performance of those tasks). Further, in some examples, the security data sources 104-108 include at least one data source that includes data describing or otherwise associated with known cybersecurity attacks, exploits, or the like. For instance, an example data source is MITRE ATT&CK that provides details about adversarial tactics, techniques, and common knowledge. Additionally, or alternatively, other example security data sources include Cloud Access Security Brokers (CASB), Data Loss Prevention (DLP) tools, Intrusion Prevention Systems (IPS), Firewall Applications, Extended Detection and Response (XDR) tools, Endpoint Detection and Response (EDR), Security Operations Center (SOC) platforms, Safety Management Systems (SMS), Learning Management Systems (LMS), or the like.

Further, the data of the security data sources 104-108 are sent to the cybersecurity platform 102 via the data interfaces 110 and/or via a gateway 112 associated with a cloud data lake as described herein. In some examples, the security data sources 104-108 are configured based on the interaction that is performed with organization stakeholders using manual questionnaires to discover and learn more about current security systems deployed by the organization that is using the cybersecurity platform 102. Once the current state of the organization system is configured with respect to the cybersecurity platform 102, connectors and/or other interfaces (e.g., data interfaces 110) are established and/or configured to receive or obtain the data from the security data sources 104-108. In some such examples, the data includes real time log data that is streamed to the cybersecurity platform 102 from the security data sources 104-108. Such streaming data can be obtained and/or received in various file formats and types (e.g., .csv, .log, .tsv, or the like). Additionally, or alternatively, the data obtained and/or received from the security data sources 104-108 includes cloud data collected by a configurable firewall from various sources (e.g., tools and/or applications that send data via network connections that are protected by the firewall also provide at least a portion of that data for collection by the firewall). It should be understood that, in some examples, the streaming of data from the security data sources 104-108 to the cybersecurity platform 102 uses a streaming tool or application of the data normalizer 114 without departing from the description.

Additionally, or alternatively, in some examples, the data interfaces 110 include existing APIs that are readily available (via access key or Software as a Service (SaaS) key) to download data from the security data sources 104-108 when possible, bespoke APIs that are created for tools, platforms, or other applications for which existing APIs are not readily available (e.g., a bespoke API that is configured to fetch data directly from a security data source in real time), and/or data streaming connectors that are configured to push data from a security data source and/or pull data to the cybersecurity platform 102 for data ingestion. In some such examples, streaming software tools and/or applications are used that provide distributed, scalable, fault-tolerant, and low-latency streaming capabilities, in addition to user-friendly GUIs, metadata repositories, built-in Enterprise Service Bus (ESB), data integration dashboards, and/or data leader platforms (e.g., ATTUNITY, APACHE KAFKA, or the like).

In some examples, the security data 109 sent to the cybersecurity platform 102 includes threat intelligence data, data loss prevention (DLP) data, intrusion detection system (IDS) data, firewall-based data, or the like. The cybersecurity platform 102 uses threat intelligence data to feed into overall cyber-health insight reports and identify known vulnerabilities. Identified threat information is used by the cybersecurity platform 102 to enrich datasets and thereby later feed into the Artificial Intelligence/Machine Learning (AI/ML) modeling for use in comprehensive threat hunting. DLP data is used to identify assets at risk and the associated information is also used to enrich datasets for the AI/ML modeling. Identified DLP incidents are reported to security teams and/or other interested parties using dashboard interfaces as described herein. IDS platform logs are combined with logs and/or other platform output of other security tools and/or applications to generate enriched insights in real-time on potential live attacks and/or intrusions. Firewall logs are combined with logs of other security tools and/or applications to generate enriched insights in real-time on potential live attacks and/or intrusions (e.g., in combination with the IDS platform logs). Additionally, or alternatively, in some examples, Common Vulnerabilities and Exposures (CVE) data is gathered from CVE frameworks to further enable the identification of assets that are at risk of being targeted within the organization's ecosystem.

In some examples, the data normalizer 114 includes hardware, firmware, and/or software configured to receive raw data feeds and then parse and/or normalize the raw data into normalized data. In some such examples, the normalized data is further enriched and then stored in the data storage 116. Further, in some such examples, the data normalizer 114 includes data streaming tools and/or platforms, tools for organizing, implementing, and/or otherwise interacting with data storage entities such as data warehouses and/or data lakes, tools or applications for data integration, data integrity and governance, and/or application and Application Programming Interface (API) integration. It should be understood that, in some examples, the data normalizer 114 interacts with one or more other layers of the cybersecurity platform 102 to perform the described operations (e.g., interacting with the governance layer 128 during or in association with the data normalization process to ensure that governance requirements are met).

Additionally, or alternatively, in some examples, the data normalizer 114 is configured to perform operations to engineer or otherwise generate data features using the raw data received from the security data sources 104-108. In some such examples, the data normalizer 114 includes or is otherwise associated with a temporary big data storage entity configured for storing the raw security data 109. The data normalizer 114 is configured to obtain the security data 109 from that temporary storage to perform normalization operations as described herein and then to store the resulting normalized security data 117 in the data storage 116. Additionally, or alternatively, the data storage 116 includes big data storage, one or more data bases, or other types of data storage without departing from the description.

In some examples, the data normalizer 114 is configured to create combined datasets by extracting and/or joining logs and/or platform output data from the multiple security data sources 104-108 to create the normalized security data 117, which includes enriched datasets as described herein in some examples. The data normalizer 114 performs parsing and/or normalization operations to make the normalized security data 117 ready for use in machine learning operations of the AI engine 118.

Further, in some examples, the normalization operations performed by the data normalizer 114 includes scaling of numerical data, creation of 'dummy' features for categorical data, and/or anonymization of Personal Identification Information (PII) wherever possible. The scaling includes adjusting the sizes of data values from different data sources to be of similar ranges such that data from sources with significantly larger values does not overpower data from sources with smaller values when the combined data is analyzed and/or used to perform machine learning operations. Categorical data is normalized by generating numerical and/or binary data values that represent each category so that the data can be represented numerically. In some such examples, these newly created numerical values are known as 'dummy' features. For instance, if a category has three different categorical options, each option is assigned a binary data value using two binary bits (e.g., a first categorical option is assigned '01', a second categorical option is assigned '10' and a third categorical option is assigned '11').

In some examples, the security data 109 that is normalized by the data normalizer 114 and/or otherwise analyzed in the cybersecurity platform 102 include data flow data values that indicate how data is flowing within the system associated with the security data sources 104-108, Domain Name System (DNS) requests made from within the system, differences between patterns of current network requests and past network requests, and/or average time differences between subsequent requests. Differences in patterns of such data are detected in the enriched datasets of the cybersecurity platform 102 and analyzed therein to detect and/or predict attacks, intrusions, or other issues, as described herein.

For instance, in some examples, types of data used as part of the security data 109 includes authentication data representing authentication events collected from individual desktop computers and/or servers, process start and stop data representing process start and stop events collected from individual desktop computers and/or servers, network flow data including network flow events collected from central routers within the network, DNS lookup events collected from the central DNS servers within the network, and/or event data that represents specific events taken from the authentication data that present known compromise events (e.g., events indicating that security is compromised).

In such examples, these events are used as ground truth of bad behavior that is different from normal user and computer activity. Further, in some such examples, types of data include data from security tools, such as Denial of Service (DOS) defense tools configured to resist or prevent a variety of DoS attacks, and data associated with regular network traffic during periods when no attacks are occurring.

Additionally, or alternatively, in some examples, the normalized security data from multiple security data sources 104-108 are merged or otherwise joined to create enriched ML-ready data sets (e.g., the normalized security data 117), which are stored in the data storage 116. In some examples, the data storage 116 includes multiple platforms, tools, and/or other data storage applications for different types of data (e.g., different platforms for storing structured data and unstructured data).

Further, in some examples, the data storage 116 includes a secondary database for storing aggregated data from the big-data storage (e.g., aggregation of data therein is carried out periodically (every 30 minutes or 1 hour)). The aggregated database is used as a "single source of truth" for presenting security information on security dashboard interfaces. This security information enables users to view the current state of security in the system and to react to issues that arise (e.g., detected intrusions, identification of likely attack targets, or the like).

In some examples, the AI engine 118 includes hardware, firmware, and/or software configured to use one or more models to analyze the normalized data in order to detect anomalies and/or predict security events. In some such examples, the one or more models of the AI engine 118 are trained using machine learning techniques to perform operations such as investigating the aggregated, normalized security data for anomalous patterns, hunting and/or identifying threats based on the security data, and/or generating recommendations for actions that can be taken to improve the security of the system in some way.

In some examples, the AI engine 118 deploys ML models to analyze live, real-time data to hunt for potential threats on the associated system that may have been missed by the individual cybersecurity tools and/or platforms (e.g., the security data sources 104-108) and/or to determine and provide security recommendations that elaborate on potential and/or identified threats or associated vulnerabilities on the associated system. Further, in some such examples, the AI engine 118 is configured to train and use use-case specific ML model automation to target the identification and handling of specific vulnerabilities and/or threats. Additionally, or alternatively, in some examples, the AI engine 118 executes multiple ML models, including composite models in some such examples, on the enriched data of the normalized security data 117 in real-time and the AI engine 118 selects the best model for a particular situation and/or use-case. Further, in some such examples, the AI engine 118 stores and retrieves ML models used in the past for use with enriched historical data and/or to apply to new situations that correspond to the stored ML models.

In some examples, the use-cases for which the AI engine 118 includes trained ML models include advanced analytics use-cases such as identifying any unwarranted traffic emanating from user machines within the domain of the associated system to any external network connect, identifying unauthorized file/setting change requests and mitigating possible data loss risk in real-time, identifying suspicious login requests from multiple locations and blocking the account to prevent data theft. Further, in some examples, the use-cases include advanced threat detection use-cases such as using advanced predictive threat detection techniques to prevent future attacks, identifying abnormal changes in IPs and acting based on the analysis, and/or monitoring in and/or out traffic movements to protect from anomalous cyber traffic and attacks. Additionally, or alternatively, in some examples, the use-cases include insider threat detection use-cases such as threat hunting for security vulnerabilities and providing customized access to security team members and/or identifying the malicious websites and blocking watering hole attacks. Further, in some examples, the use-cases include traffic analysis and/or data exfiltration use-cases such as identifying user behavior and tracking/blocking the sensitive data movements and/or preventing data loss from phishing activities. In other examples, the AI engine 118 includes models trained for use in more, fewer, or different use-cases without departing from the description.

Further, in some examples, the AI engine 118 is configured to automate and evaluate the training and use of ML models for use-cases as described herein. In some such examples, the AI engine 118 includes industry-specific ML models that are created to identify appropriate parameters for target organizations and geographies. Further, operation of the AI engine 118 includes periodically refreshing ML models to keep up with evolving cybersecurity trends and attacks (e.g., through the use of updated CVE data).

ML models of the AI engine 118 that have been trained on past data are fed live data feeds from the data storage 116 (e.g., feeds of the normalized security data 117) to detect potential threats in real-time. In some such examples, these processes use a serverless compute service or the like. Such models are evaluated based on precision at identifying and/or predicting real threats and reduction of false negatives (e.g., a prediction of a non-attack when there is an attack in progress). Additionally, or alternatively, anomalies and/or other related issues that are detected or identified by an ML model are stored in a secondary database or data storage for remediation (e.g., automatic security response orchestration as described herein) and for manual analysis by security teams. The AI engine 118 captures high quality threat intelligence feeds and prepares robust models for incident response, security operations, vulnerability management, risk analysis, threat hunting, and fraud management.

Further, in some examples, the cybersecurity platform 102 is configured to perform automated incident response operations, such as Security Orchestration, Automation and Response (SOAR) which dynamically protects against identified and potential threats using implemented remedial responses, security workflow orchestration, and/or dynamic automated risk management and response operations. Additionally, or alternatively, the cybersecurity platform 102 includes a standalone incident management system (e.g., a ticketing system) that enable the deployment of a process-driven approach for cybersecurity management (e.g., JIRA, ZENDESK, MANTIS, or the like).

In some examples, the cybersecurity platform 102 includes a security layer 120 that enables other layers 122 of the cybersecurity platform 102 to access the data in the data storage 116. In some such examples, the other layers 122 include an operations layer 124, a discovery layer 126 (e.g., a layer of tools or other applications for discovering, preparing, moving, and/or integrating data from multiple sources for analytics, machine learning (ML) and application development), a governance layer 128 (e.g., a layer of tools or other applications for providing security, governance, and compliance controls associated with permissions, access controls, account management, code security, or the like), and/or other data processing layers 130. The security layer 120 is configured to secure access to the data storage 116 by requiring permissions to access the data storage 116 and/or portions of the data storage 116, and/or by otherwise enforcing password protection, encryption, and/or other types of security policies.

In some examples, the visualization layer 132 includes hardware, firmware, and/or software configured to display, present, or otherwise provide access to the aggregated security data and/or information that is determined about the security data using the AI engine 118 and/or other entities within the cybersecurity platform 102. In some such examples, visualizations that are provided via the visualization layer 132 include a holistic cybersecurity health assessment interface generated based on the aggregated, normalized data from the multiple security data sources 104-108, high-level system analytics interfaces, incident/event description and management interfaces, alert management interfaces including individual tools and incident predictions, team and/or role management interfaces, or the like.

In some examples, the visualization layer 132 displays or otherwise presents dashboard interfaces with web- and/or mobile-friendly views to provide security teams and Chief Information Security Officers (CISOs) with insights into overall real-time system health. CISOs and security teams are enabled to view high-level analytics of overall system health, alerts from individual security tools and/or platforms (e.g., individual security data sources 104-108), and/or deeply review detected incidents via logs and other associated incident information. Additionally, or alternatively, in some examples, management dashboards associated with roles and responsibilities are displayed or otherwise presented to provide for effective and real-time team management. Further, the visualization layer 132 displays or otherwise presents incident deep-down views with the ability to retrieve logs related to specific events. This type of visualization enables users to retrieve logs via email or other platform interfaces to carry out manual analyses.

Figure 2:
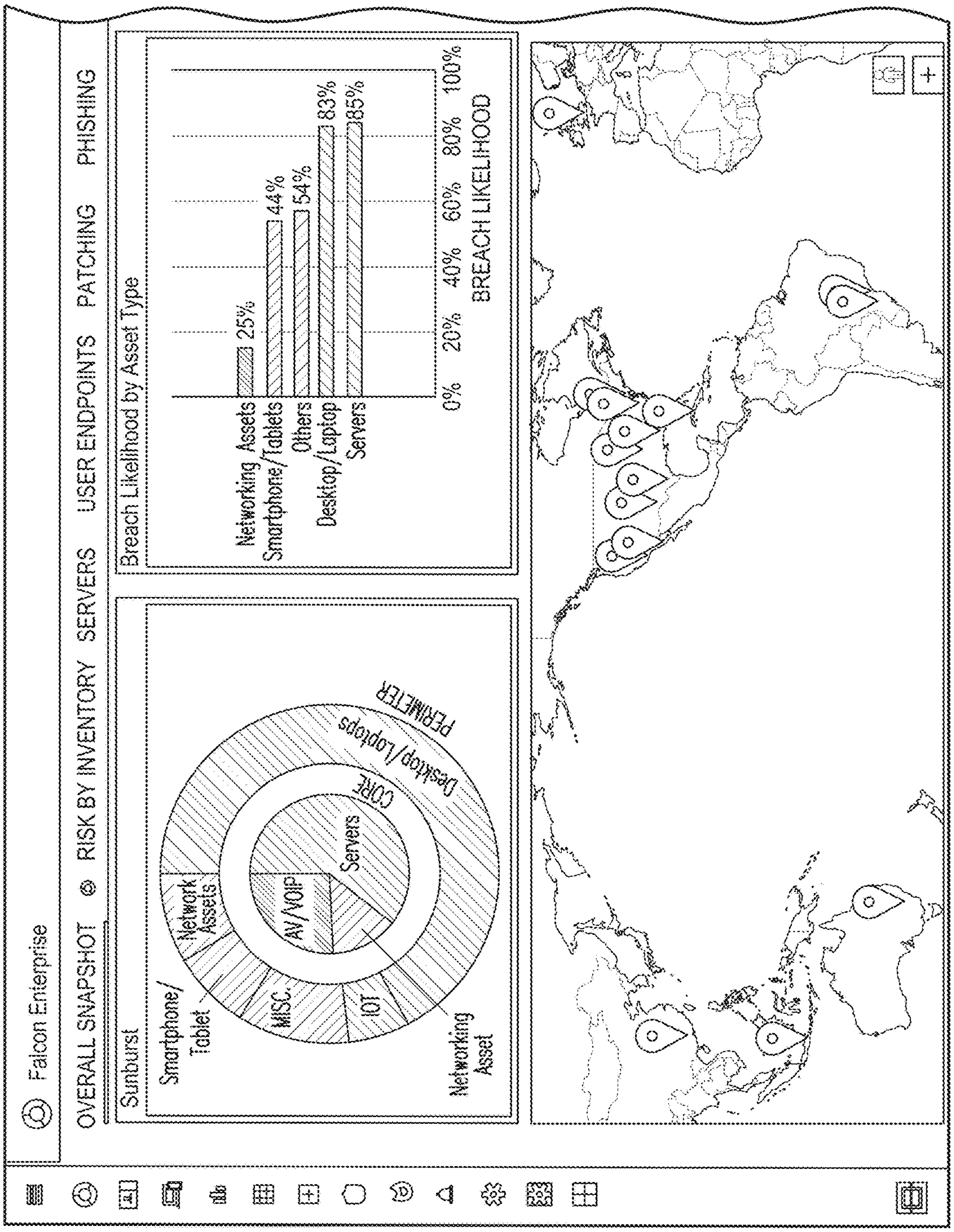
FIG. 2 is diagram illustrating a dashboard GUI displaying data associated with potential system breaches.
Figure 2:
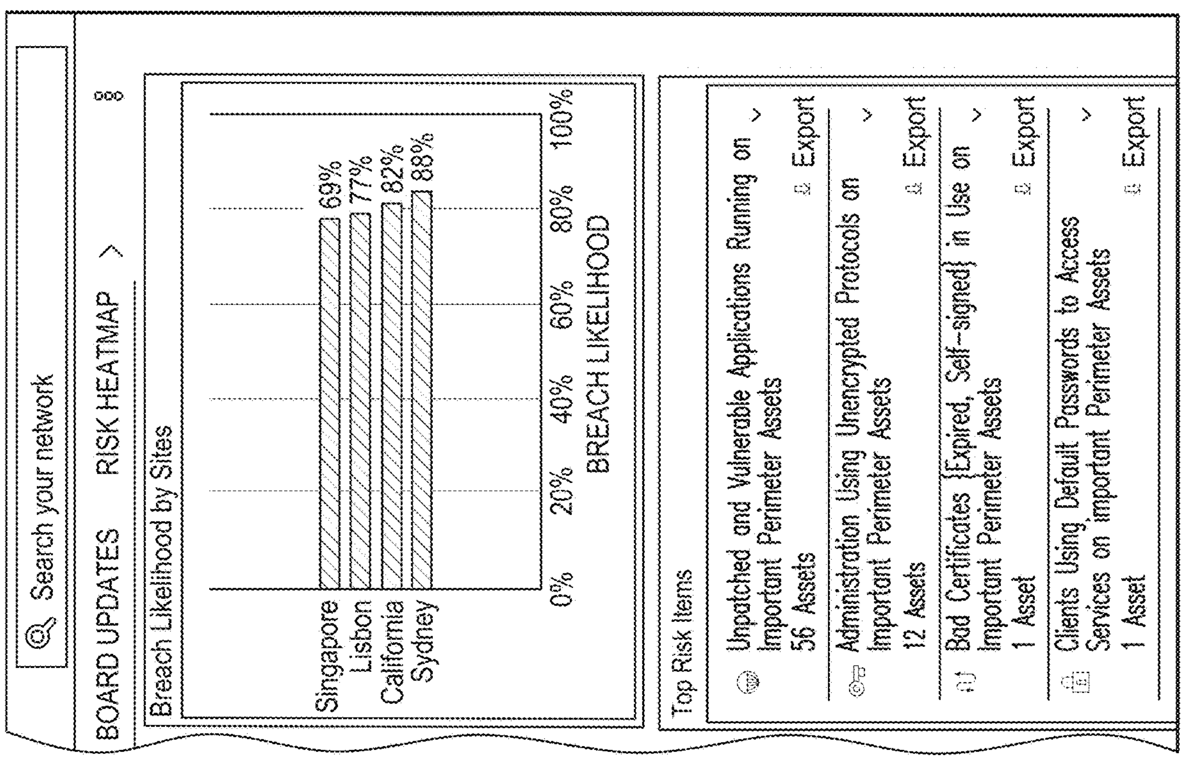

FIGS. 2-5 include example Graphical User Interface (GUI) visualizations that are provided as part of the visualization layer 132 in some examples. FIG. 2 is an example dashboard GUI 200 displaying data associated with potential system breaches. As illustrated, the GUI includes several different visualizations of the data to enable a viewer to interpret the potential system breach data in several different ways. The visualizations include a sunburst pattern that displays likelihood of various assets being targeted in a system breach, a bar diagram that illustrates breach likelihood by asset type, a bar diagram that illustrates breach likelihood by sites, a map that illustrates locations of sites that may be targets of breaches, and a list of top risk items with respect to breach likelihood. Further, the GUI displays a menu of other visualization options, including a tab for "Risk by Inventory", a tab for "Servers", a tab for "User Endpoints", a tab for "Patching", a tab for "Phishing", a tab for "Board Updates" and a tab for "Risk Heatmap". It should be understood that, in other examples, more, less, or different information is displayed as part of the GUI 200 without departing from the description.

Figure 3:
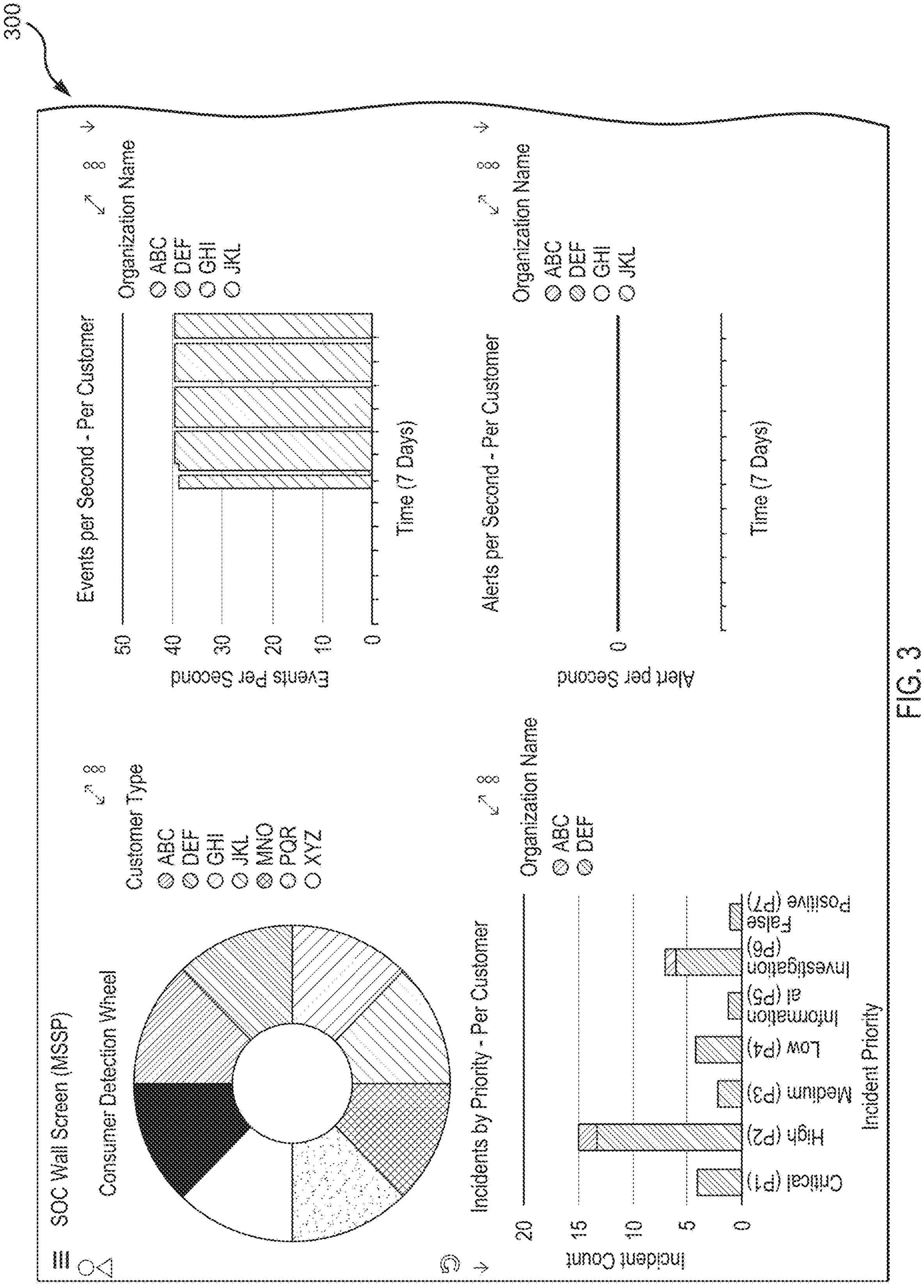
FIG. 3 is a diagram illustrating a dashboard GUI displaying data associated with events, incidents, and alerts in association with customer interactions.
Figure 3:
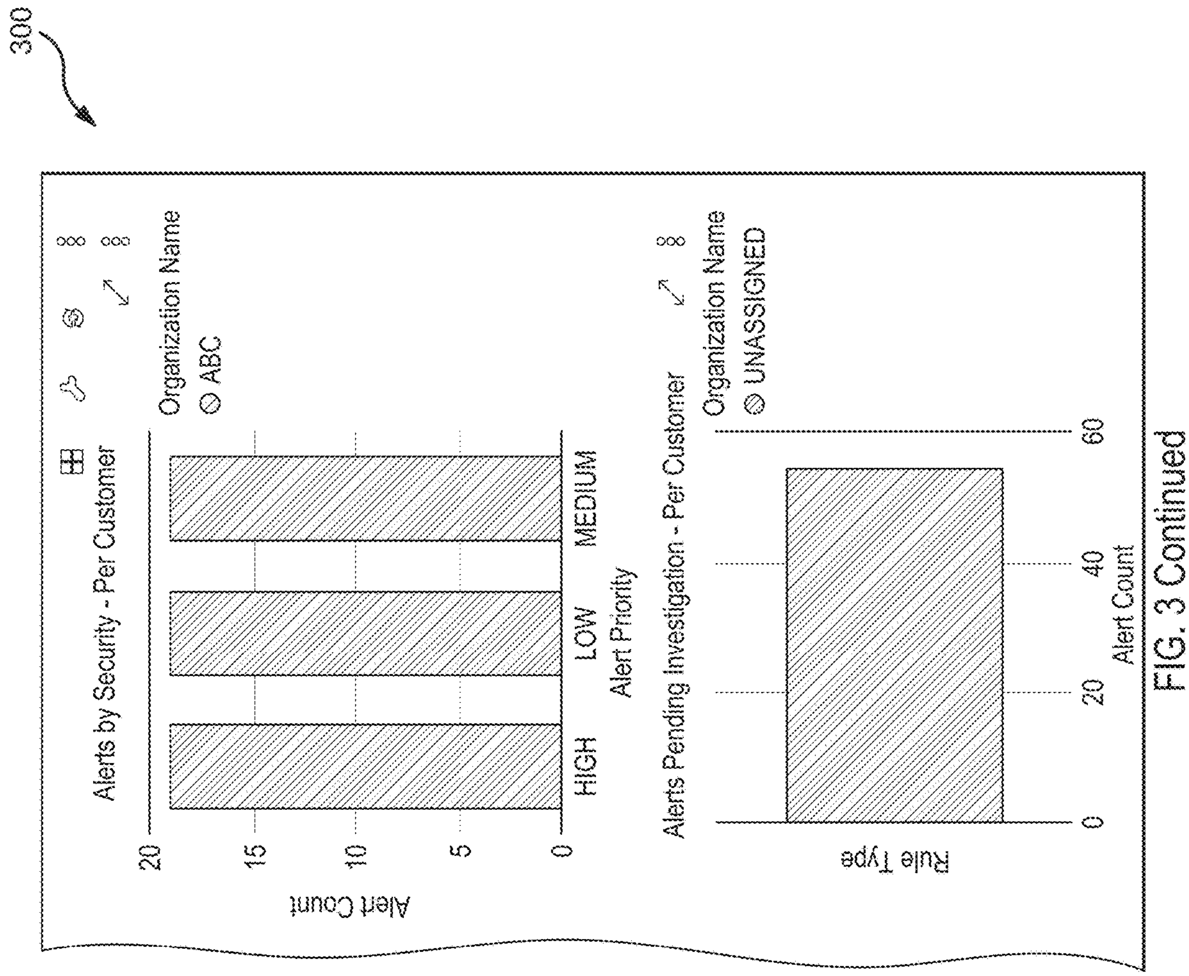

FIG. 3 is an example dashboard GUI 300 displaying data associated with events, incidents, and alerts in association with customer interactions. For instance, in some examples, events include some instances of a customer interacting with an organization in such a way that the instance is logged, incidents include instances of an event occurring that is considered negative and/or that requires some sort of action to be taken to remediate it, and alerts are notifications that can be triggered by incidents or other events on the system that need to be addressed. As illustrated, the GUI 300 includes several different visualizations of the data to enable a viewer to interpret the events, incidents, and alerts data in several different ways. The visualizations include a wheel diagram that displays customer selections of different organizations, a bar diagram that illustrates events per second per customer over time, a bar diagram that illustrates alerts by severity per customer, a bar diagram that illustrates incidents by priority per customer over time, a line diagram that illustrates alerts per second per customer over time, and a bar diagram that illustrates alerts pending investigation per customer. It should be understood that, in other examples, more, less, or different information is displayed as part of the GUI 300 without departing from the description.

Figure 4:
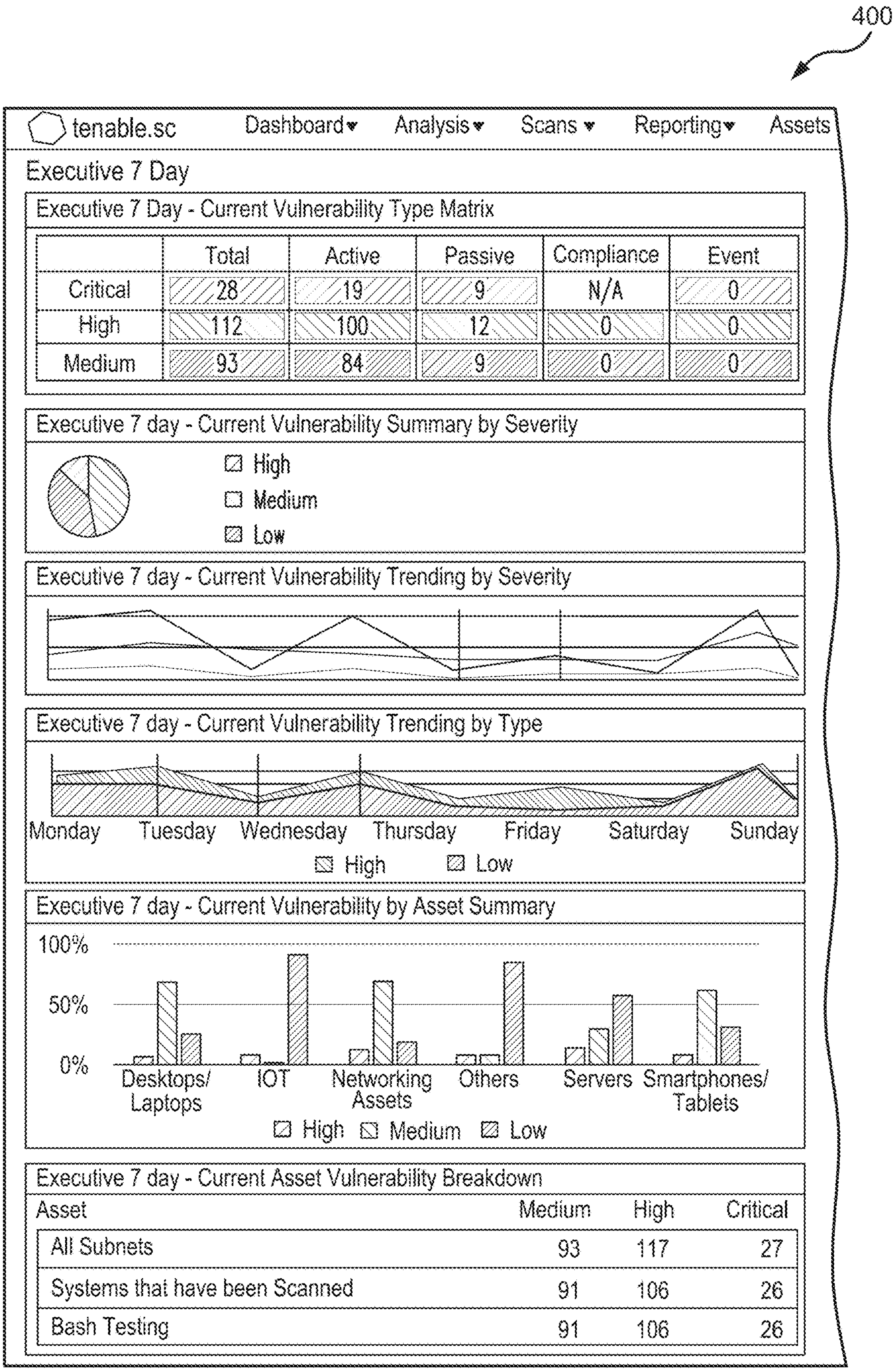
FIG. 4 is a diagram illustrating a dashboard GUI displaying data associated with types of vulnerabilities of a system.
Figure 4:
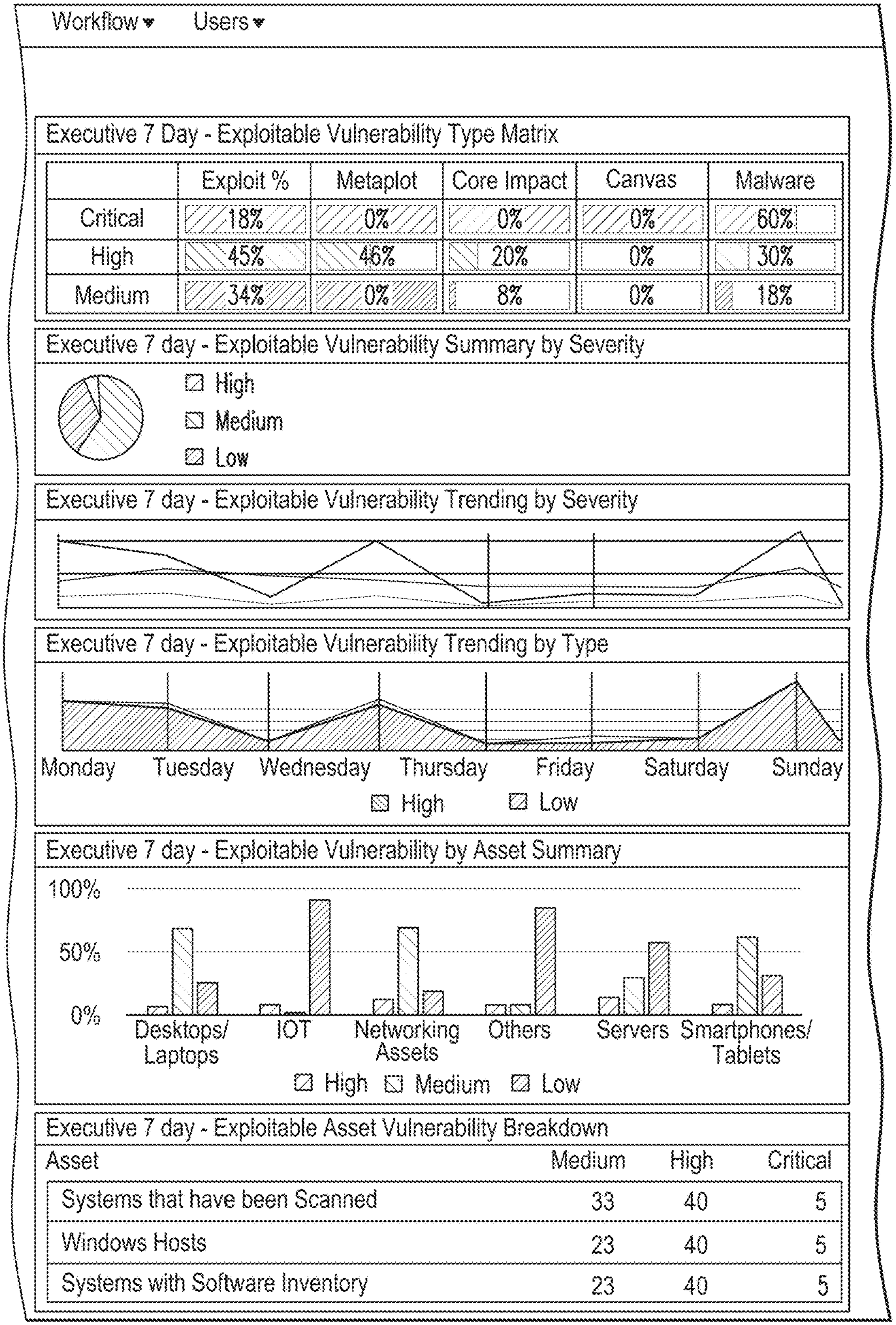

FIG. 4 is an example dashboard GUI 400 displaying data associated with types of vulnerabilities of a system. As illustrated, the GUI 400 includes three columns of visualizations including a first column displaying data associated with current vulnerabilities, a second column displaying data associated with exploitable vulnerabilities, and a third column displaying data associated with mitigated vulnerabilities. Each column includes a series of charts including a vulnerability type matrix, a pie chart illustrating a vulnerability summary by severity, a line chart illustrating vulnerability trending by severity, a stacked line chart illustrating vulnerability trending by type, a bar chart illustrating a vulnerability asset summary, and a table providing data in an asset vulnerability breakdown. Each column includes the same types of charts and other visualizations that are populated with data specific to the column. It should be understood that, in other examples, more, less, or different information is displayed as part of the GUI 400 without departing from the description.

Figure 5:
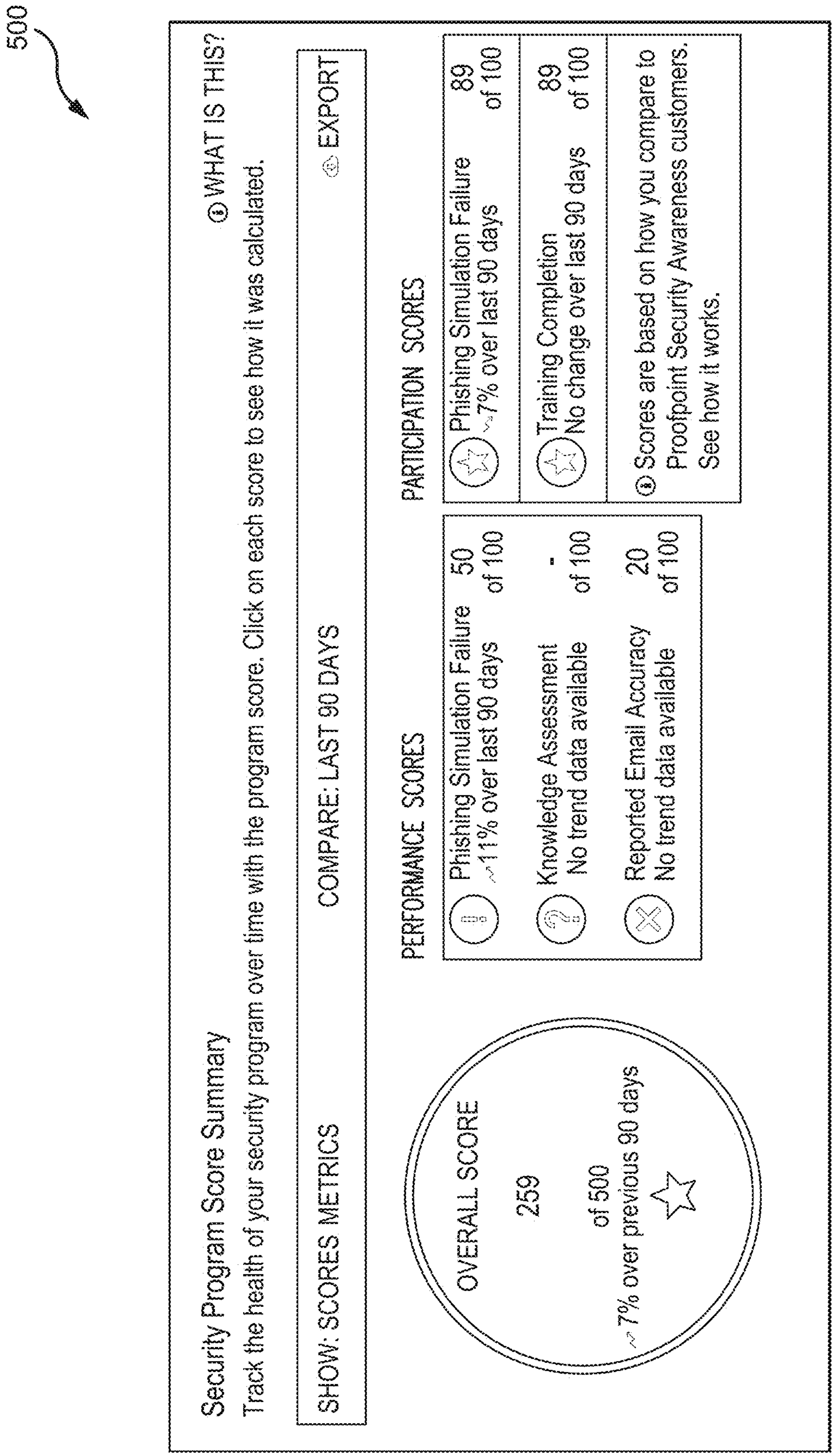
FIG. 5 is a diagram illustrating a dashboard GUI displaying data associated with a security program score of an organization.

FIG. 5 is an example dashboard GUI 500 displaying data associated with a security program score of an organization. As illustrated, the GUI 500 includes a large graphic that shows the current overall score (e.g., 259 out of 500) and a percent increase in the score over the past 90 days. Then, the GUI 500 includes a column of performance scores, including a Phishing Simulation Failure score, a Knowledge Assessment score, and a Reported Email Accuracy score. Next, the GUI 500 includes a column of participation scores, including a Phishing Simulation Reporting score and a Training Completion score. Additionally, the GUI 500 includes an indication that the displayed scores are being compared with data from the last 90 days and links that enable the user to show scores and/or metrics associated with the scores. It should be understood that, in other examples, more, less, or different information is displayed as part of the GUI 500 without departing from the description.

Figure 6:
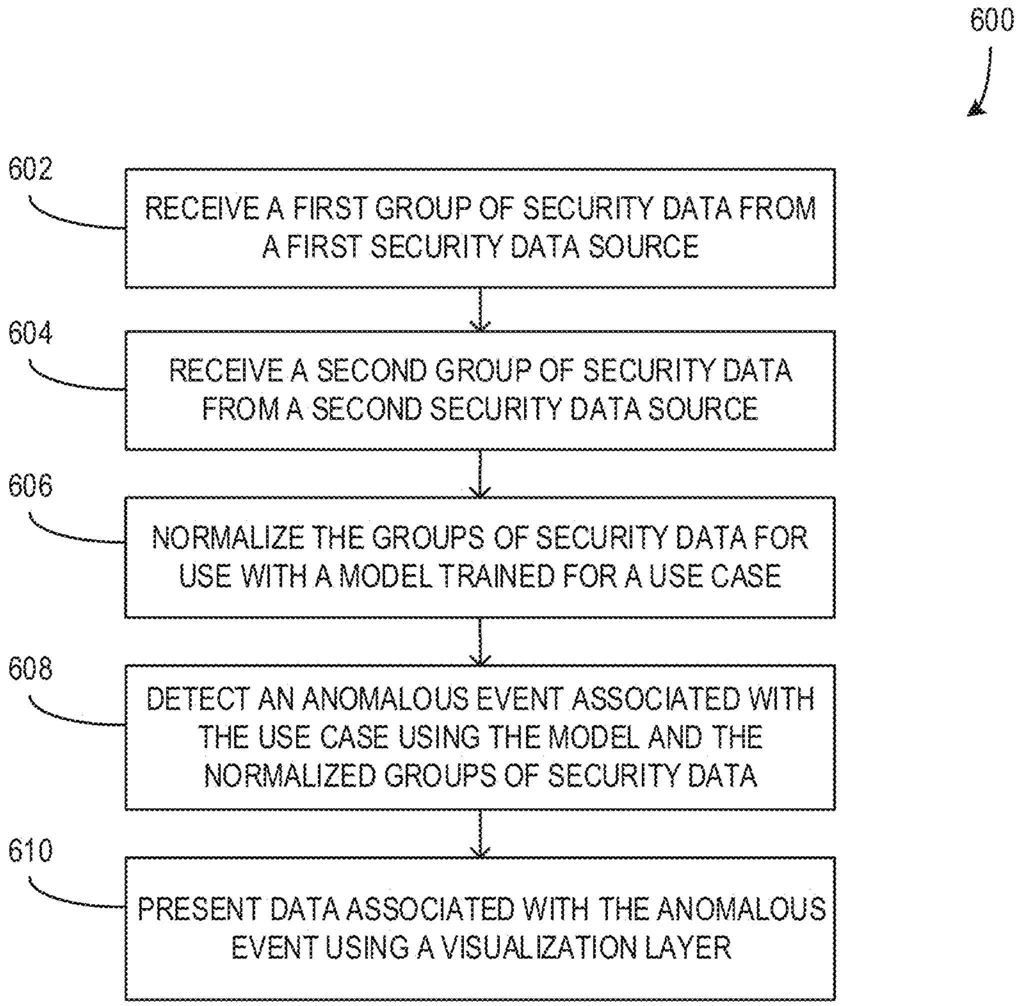
FIG. 6 is a flowchart illustrating a method configured for detecting an anomalous event in a system using security data from multiple security data sources.

FIG. 6 is a flowchart illustrating a method 600 configured for detecting an anomalous event in a system using security data (e.g., security data 109) from a plurality of security data sources (e.g., security data sources 104-108). In some examples, the method 600 is executed or otherwise performed in a system such as system 100 of FIG. 1.

At 602, a first group of security data is received from a first security data source and, at 604, a second group of security data is received from a second security data source. In some examples, the first and second security data sources are different security tools, platforms, and/or other applications configured to monitor and/or collect data from within a system that is being monitored, as described herein. For instance, in an example, the first security data source is a tool that monitors data traffic into and/or out of the monitored system while the second security data source is a platform that captures user details and other associated data during users' interactions with the system (e.g., user ID, device data associated with the users' devices, or the like). In other examples, the two security data sources are different types of tools, platforms, or other applications without departing from the description.

Further, it should be understood that, in some examples, the method 600 is configured to receive groups of security data from other security data sources in addition to or instead of the first and second groups of security data from the first and second security data sources. For instance, in an example, the method 600 receives three or four groups of security data from three or four respective security data sources without departing from the description.

Additionally, or alternatively, in some examples, the groups of security data are received from the security data sources via some combination of APIs, connector interfaces, data streaming interfaces, or other interfaces (e.g., the data interfaces 110 and/or the cloud data lake gateway 112) without departing from the description. For instance, in some examples, the groups of security data are received using data interfaces including one or more of APIs associated with security data sources, connected interfaces, and/or data streaming interfaces. Further, in another example, the data received from the first security data source is received via a standard API while the data received from the second security data source is received via a specialized or bespoke API created for the second security data source specifically. In other examples, more or different interfaces are used to receive the groups of security data without departing from the description.

At 606, the groups of security data are normalized such that the normalized first and second groups of security data are compatible or otherwise usable with a model trained for a use case. In some examples, the normalization is performed using a data normalizer (e.g., data normalizer 114) as described herein. For instance, in some examples, the normalization includes one or more of the following: scaling numerical data values such that values from each of the groups of security data are of similar scales, synchronizing event data between the groups of security data, generating new data features based on categorical data values such that the new data values can be used with the model, and/or anonymizing any personal information in the security data. Additionally, or alternatively, the normalization includes the generation of aggregate data features from multiple raw data values of either or both groups of security data (e.g., a first data value from the first group of security data is combined with a second data value from the second group of security data to form an aggregate data feature that indicates a rate of the quantity of the first data value per the quantity of the second data value).

At 608, an anomalous event associated with the use case is detected using the model and the normalized groups of security data. In some examples, the model is part of an AI engine (e.g., AI engine 118) as described herein. Further, the model is trained using machine learning techniques to perform operations for detecting anomalous events such as the one detected at 608. For instance, in some examples, at least a portion of the normalized first group of security data and at least a portion of the normalized second group of security data are provided to the model as input and the model performs operations on the input to generate output data that indicates whether the anomalous event has occurred. Further, in some such examples, the output data includes other data associated with any anomalous events that have occurred, such as data indicating the time of occurrence and other context data, such as data indicating a device upon which the event occurred, a user profile associated with the event, or the like.

It should be understood that, in some examples, the model is trained to perform the use case of detecting this specific type of anomalous event. For instance, in an example, the model is trained using training data that includes sets of security data from the first and second security data sources that are associated with instances of the anomalous event that have occurred in the past. During training, the model is provided with the security data of the training data and its performance is evaluated based on whether the model accurately detects an anomalous event or not. The evaluation includes generating loss data associated with the accuracy of the model which is then used to adjust parameters and/or other aspects of the model to improve its accuracy during future data analyses. In many examples, the training of the model is performed iteratively, such that the performance of the model at detecting the anomalous event is improved over multiple iterations until its accuracy is of an acceptable level.

Additionally, or alternatively, in some examples, the AI engine includes multiple models that are trained to perform multiple use cases using the first and second groups of security data of the first and second security data sources. In some such examples, the method 600 includes providing the groups of security data as input to multiple trained models and those trained models performing operations according to their respective use cases. The resulting output of the trained models includes detection of anomalous events, identification of system vulnerabilities, detecting abnormal user behaviors, prediction of future intrusions or other incidents, or the like, as described herein.

At 610, data associated with the anomalous event is presented using a visualization layer (e.g., visualization layer 132). In some examples, the presented data includes a displayed notification that includes information about the event, such as when the event occurred, systems, subsystems, and/or devices affected by the event, information about the likely cause of the event or the like. For instance, in an example, the presented data includes one or more of the following: a datetime of the anomalous event, a user profile associated with the anomalous event, a network traffic log associated with the anomalous event, and/or a running process associated with the anomalous event. Additionally, or alternatively, the presented data includes displaying a dashboard that includes statistical information about the system and the data associated with the anomalous event is included in the statistical information (e.g., a chart is displayed that indicates a quantity of similar events that have occurred over a particular time period).

Additionally, or alternatively, in some examples, in response to detecting the anomalous event and/or another trained model being triggered as described herein, the method 600 includes automatically performing a remedial operation. For instance, in some examples, remedial operations include one or more of the following: blocking network traffic from outside the system that is associated with an anomalous event, preventing the performance of other operations associated with a predicted future intrusion, halting processes associated with detected system vulnerabilities, and/or temporarily revoking system access permissions for a user associated with abnormal behaviors. For instance, in an example, a predicted future intrusion or other security event includes one or more of the following: abnormal behavior associated with a user profile, a detected intrusion over an external network connection, and/or abnormal behavior by a running process. It should be understood that, in some examples, such automatic remedial operations are performed in addition to the data associated with the anomalous event being presented. For instance, in an example, the method 600 detects an anomalous event occurring in association with a particular user profile and, in response, access permissions of that user profile are temporarily revoked, and a notification of the anomalous event is presented to a security team member. Thus, the method 600 prevents further issues associated with the user profile and gives the security team member time to address any issues in a more permanent manner. In other examples, other combinations of automatic remedial operations and data presentation are used without departing from the description.

EXAMPLE USE CASES

In an example, the cybersecurity platform 102 identifies unwarranted traffic emanating from a user machine within the domain to an external network using data size information from a Network Operations Center (NOC), network flow data from a DLP tool, user details from an Identity and Access Management (IDAM) tool, endpoint activity data from an EDR tool, and/or domain whitelisting data associated with the destination of the traffic.

In an example, the cybersecurity platform 102 identifies unauthorized file/setting change requests and mitigates possible data loss risk in real-time. The platform uses authentication data from an IDS tool, user details and authentication data from an IDAM tool, source computer data and process start and stop time from a Security Information and Event Management (SIEM) tool, and network flow data from a Next-Generation Firewall (NGFW).

In an example, the cybersecurity platform 102 identifies suspicious login requests from multiple locations and blocks the account to prevent data theft. The cybersecurity platform 102 uses log data, DNS data, and authentication data from an SIEM tool, user details and source and destination port information from an IDAM tool, network flow data from an NGFW, traffic and authentication data from an IPS tool, and/or endpoint data of the source computer from an Endpoint Detection and Threat Response (EDTR) tool.

In an example, the cybersecurity platform 102 identifies multiple login requests with incorrect credentials. The cybersecurity platform 102 uses access log data details from a Web Application Firewall (WAF), inbound and outbound traffic data from a Secure Web Gateway (SWG), log data for Internet Protocol (IP) address details and contextual information (e.g., user ID, device type) from a Network Access Control (NAC) tool.

In an example, the cybersecurity platform 102 uses advanced predictive threat detection techniques (e.g., trained models as described herein) to prevent future attacks. The cybersecurity platform 102 uses user details from an Active Directory (AD) tool, cloud data from a CASB tool, email details from a DLP tool, cloud data from an NGFW, and endpoint data from an EDTR tool.

In an example, the cybersecurity platform 102 monitors traffic movements and protects from anomalous cyber traffic and associated attacks. The cybersecurity platform 102 uses traffic data from an IDS tool, traffic data from an IPS tool, user details from a Unified Access Management (UAM) tool, user details from an IDAM tool, and system files and anti-malware executable program files from a File Integrity Monitoring (FIM) tool.

In an example, the cybersecurity platform 102 identifies abnormal changes in IP usage and acts based on that analysis. The cybersecurity platform 102 uses user details from an AD tool, log data from an SIEM tool, user details from an IDAM tool, email data from an DLP tool, contextual data from an NAC tool, traffic data from an WAF, and endpoint data from an EDTR tool.

In an example, the cybersecurity platform 102 quantifies all potential risks to set the priority of action when needed. The cybersecurity platform 102 uses different channel details for the data transmission outside of the network from a DLP tool, activity and event data of endpoints from an EDR tool, cloud data, firewall data, and traffic data from a WAF, and network traffic data to detect anomalies in traffic flow from an IPS tool.

In an example, the cybersecurity platform 102 prevents security threats using different rules, such as observed rules, threshold rules, trend monitoring rules, statistics rules, value changed rules, never seen before rules, add list rules, and expert rules. The cybersecurity platform 102 uses email and other channel details for data transmission outside of the network from a DLP tool, log data from an SIEM tool, user activity details from a UAM tool, user details from an IDAM tool, system files and associated directory data from an FIM tool, network traffic data for anomaly detection from an IDS tool, email data from a Secure Email Gateway (SEG) tool, and contextual information (e.g., user ID, device type) from an NAC tool.

In an example, the cybersecurity platform 102 identifies security vulnerabilities and potential threats and provides customized access to security team members. The cybersecurity platform 102 uses network and on-premise data from vulnerability scanners, endpoint data from an EDR tool, traffic data and other network data from an SWG tool, contextual data from an NAC tool, email and other channel details for data transmission outside of the network from a DLP tool, activity and event data of the endpoints from an EDR tool, and cloud data from a WAF.

In an example, the cybersecurity platform 102 identifies malicious websites and blocks watering hole attacks associated therewith. The cybersecurity platform 102 uses user details from an IDAM tool, user details from a User and Entity Behavior Analytics (UEBA) tool, user data from a UAM tool, website authorization and anti-virus executable program files, and email data from a DLP tool.

In an example, the cybersecurity platform 102 identifies user behavior associated with sensitive data and tracks and/or blocks movement of the sensitive data. The cybersecurity platform 102 uses user details from an IDAM tool, endpoint transmission data from an endpoint DLP tool, endpoint data from an EDR tool, and cloud data from a new age CASB tool.

In an example, the cybersecurity platform 102 prevents data loss from phishing activities. The cybersecurity platform 102 uses email data from an SEG tool, cloud data from an Intrusion Detection and Prevention System (IDPS) tool, email data from a DLP tool, endpoint data from an EDTR tool, and anti-virus executable program files.

In an example, the cybersecurity platform 102 monitors users when they try to access sensitive data for the first time and tracks their future activities to prevent data loss. The cybersecurity platform 102 uses user activity data from a UEBA tool, user details from an IDAM tool, and log data from an SIEM tool.

In an example, the cybersecurity platform 102 detects unusual user activities (e.g., anomaly detection) related to unauthorized data access and sharing. The cybersecurity platform 102 uses email and other channel details for data transmission outside of the network from a DLP tool, traffic data from an IPS tool, and network traffic data for malicious actors.

In an example, the cybersecurity platform 102 triggers an alert when it finds multiple fail login requests from specific IPs within a small amount of time and/or it blocks those IPs to prevent data loss. The cybersecurity platform 102 uses log data from an SIEM tool and log data from an AD tool.

In an example, the cybersecurity platform 102 detects and/or prevents access to different servers and other data sources when it comes from unrecognized devices, and it can also quarantine devices temporarily to prevent attacks. The cybersecurity platform 102 uses log data from an SIEM tool, traffic data from a firewall, and/or contextual information (e.g., user ID, device type, or the like) from an NAC tool.

In an example, the cybersecurity platform 102 monitors all types of data movement activities and prevents activities if it goes beyond the baseline or if it contains any sensitive data. The cybersecurity platform 102 uses email and other channel details for data transmission outside of the network from a DLP tool and activity and event data of the endpoints from an EDR tool.

In an example, the cybersecurity platform 102 monitors the day-to-day user activities and gives special attention in cases of any unusual behavior like abnormal session start time and upload/download requests. The cybersecurity platform 102 uses log data from an SIEM tool, user details from an IDAM tool, and email and other channel details for data transmission outside of the network from a DLP tool.

In an example, the cyber security platform 102 monitors traffic movement and triggers alerts if it finds unusual movements to a rare domain and/or the cybersecurity platform 102 identifies the user details of who are involved. The cybersecurity platform 102 uses user details from an IDAM tool, network traffic data from a WAF, and contextual information (e.g., user ID, device type) from an NAC tool.

In an example, the cybersecurity platform 102 monitors all types of data movement activities across individual end-point devices in the metaverse. The platform 102 uses enriched user behavior data to guard against malware, phishing, and unauthorized access. The cybersecurity platform 102 uses email and other channel details for data transmission outside of the network from a DLP tool, activity and event data of the endpoints from an EDR tool, user data from an IDAM tool, and/or network traffic data from a WAF.

In an example, the cybersecurity platform 102 uses generative AI and data as described herein to identify bad actors and activities and alert security teams in advance to aid in the prevention of unwanted activities. The cybersecurity platform 102 uses log data from an SIEM tool, user data from an IDAM tool, internal communication logs from communication tools including information about potential adversarial activities from bad actors, email and other channel details for data transmission outside of the network from a DLP tool, and/or network traffic data from a WAF.

In an example, the cybersecurity platform 102 uses device logs to identify and prevent physical attacks directed to heat up Head Mounted Devices (HMDs) of CPU hardware through overclocking. The cybersecurity platform 102 uses user data from an IDAM tool, network traffic data from a WAF, contextual information from a NAC tool, and information from HMD logs.

Exemplary Operating Environment

Figure 7:
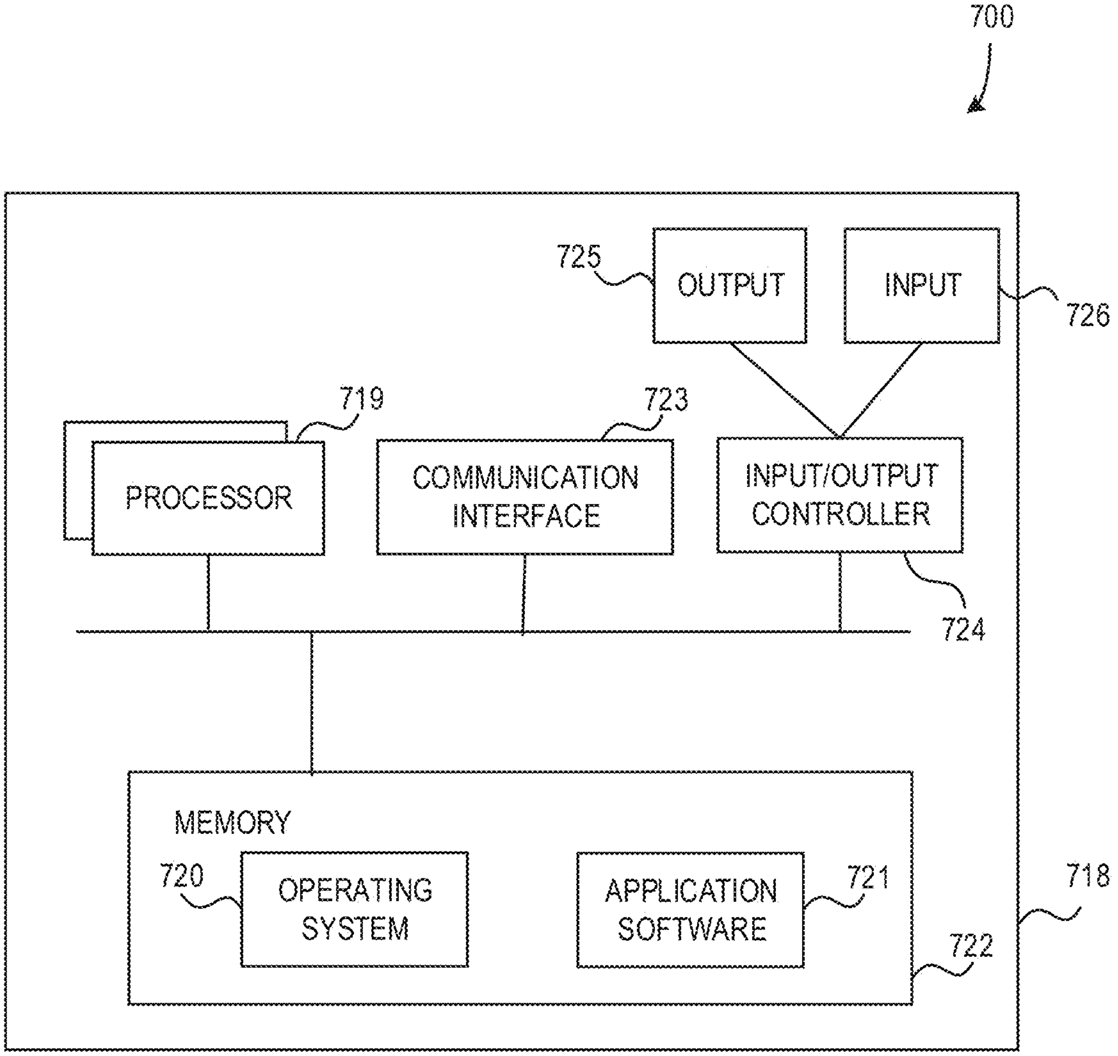
FIG. 7 illustrates an example computing apparatus as a functional block diagram for executing the instructions described herein.

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, collection of security data from multiple sources, normalization of the security data, and analysis of the normalized security data, as described herein, is accomplished by software, hardware, and/or firmware.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium does not include a propagating signal. Propagated signals are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: receive a first group of security data from a first security data source, wherein the first security data source is an intrusion prevention system (IPS) and the first group of security data includes authentication data; receive a second group of security data from a second security data source, wherein the second security data source is a firewall and the second group of security data includes network flow data; normalize the authentication data and the network flow data such that the normalized authentication data and the normalized network flow data are compatible with a model trained for detection of suspicious login events, wherein the normalizing includes: adjusting a scale of event data of the authentication data such that the event data of the authentication data and event data of the network flow data are of a same scale; and synchronizing the event data of the authentication data and the event data of the network flow data with respect to time; detect a suspicious login event using the model, the normalized authentication data, and the normalized network flow data; and automatically present data associated with the detected suspicious login event using a visualization layer, wherein the automatically presented data includes a portion of the authentication data associated with an identifier of the IPS and a portion of the network flow data associated with an identifier of the firewall.

An example computerized method comprises receiving a first group of security data from a first security data source; receiving a second group of security data from a second security data source; normalizing the first group of security data and the second group of security data such that the normalized first group of security data and the normalized second group of security data are compatible with a model trained for a use case; predicting a future security event associated with the use case using the model, the normalized first group of security data, and the normalized second group of security data; and presenting data associated with the predicted security event using a visualization layer.

One or more computer storage media having computer-executable instructions that, upon execution by a processor, case the processor to at least: receive a first group of security data from a first security data source; receive a second group of security data from a second security data source; normalize the first group of security data and the second group of security data such that the normalized first group of security data and the normalized second group of security data are compatible with a model trained for a use case; detect an anomalous event associated with the use case using the model, the normalized first group of security data, and the normalized second group of security data; and perform a remedial operation in response to the detected anomalous event.

Alternatively, or in addition to the other examples described herein, examples include any combination of the following:

- wherein the first group of security data and the second group of security data are received using data interfaces including one or more of the following: application programming interfaces (APIs) associated with security data sources, connector interfaces, and data streaming interfaces.

wherein normalizing the first group of security data and the second group of security data includes one or more of the following: scaling numerical data values of the first and second groups of security data such that the scaled data values are of similar scales and generating new data features based on categorical data values of the first and second groups of security data such that the new data features can be used with the model.

wherein the predicted future security event includes one or more of: abnormal behavior associated with a user profile, a detected intrusion over an external network connection, and abnormal behavior by a running process.

further comprising: obtaining training data including training data instances with past data from the first and the second security data sources and associated indicators of occurrences of security events; providing the past data from the first and the second security data sources to the model as input; determining feedback data indicating accuracy of the model using output of the model and the indicators of occurrences of security events; and adjusting parameters of the model using the determined feedback data, whereby the model is adjusted to be more accurate at predicting future security events.

wherein presenting the data associated with the predicted future security event using the visualization layer includes displaying the data associated with the predicted future security event in a notification interface, wherein the presented data includes one or more of the following: a predicted datetime of the future security event, a predicted user profile associated with the future security event, a network vulnerability associated with the predicted future security event, and a running process associated with the predicted future security event.

wherein presenting the data associated with the predicted future security event using the visualization layer includes displaying the data associated with the predicted future security event in a statistical data dashboard interface, wherein the presented data is included in statistical data associated with the security state of an associated system.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving a first group of security data from a first security data source; exemplary means for receiving a second group of security data from a second security data source; exemplary means for normalizing the first group of security data and the second group of security data such that the normalized first group of security data and the normalized second group of security data are compatible with a model trained for a use case; exemplary means for predicting a future security event associated with the use case using the model, the normalized first group of security data, and the normalized second group of security data; and exemplary means for presenting data associated with the predicted security event using a visualization layer.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the computer program code when executed by the processor causes the processor to:

receive a first group of security data from a first security data source, wherein the first security data source is an intrusion prevention system (IPS), and the first group of security data includes authentication data;

receive a second group of security data from a second security data source, wherein the second security data source is a firewall, and the second group of security data includes network flow data;

normalize the authentication data and the network flow data such that the normalized authentication data and the normalized network flow data are compatible with a model trained for detection of suspicious login events, wherein the normalizing includes:

adjusting a scale of event data of the authentication data such that the event data of the authentication data and event data of the network flow data are of a same scale; and synchronizing the event data of the authentication data and the event data of the network flow data with respect to time;

detect a suspicious login event using the model, the normalized authentication data, and the normalized network flow data; and automatically present data associated with the detected suspicious login event using a visualization layer, wherein the automatically presented data includes a portion of the authentication data associated with an identifier of the IPS and a portion of the network flow data associated with an identifier of the firewall.

2. The system of claim 1, wherein the first group of security data and the second group of security data are received using data interfaces including one or more of the following: application programming interfaces (APIs) associated with security data sources, connector interfaces, and data streaming interfaces.

3. The system of claim 1, wherein normalizing the authentication data and the network flow data includes generating new data features based on categorical data values of the authentication data and the network flow data such that the new data features can be used with the model.

4. The system of claim 1, wherein the suspicious login event further includes at least one of: abnormal behavior associated with a user profile, a detected intrusion over an external network connection, or abnormal behavior by a running process.

5. The system of claim 1, wherein the computer program code when executed by the processor further causes the processor to train the model for a use case, wherein the training includes:

obtaining training data including training data instances with past data from the first and the second security data sources and associated indicators of occurrences of anomalous events;

providing the past data from the first and the second security data sources to the model as input;

determining feedback data indicating accuracy of the model using output of the model and the associated indicators of occurrences of anomalous events; and adjusting parameters of the model using the determined feedback data thereby improving accuracy of the model at detecting anomalous events.

6. The system of claim 1, wherein presenting the data associated with the detected suspicious login event using the visualization layer includes displaying the data associated with the detected suspicious login event in a notification interface, wherein the presented data includes one or more of the following: a datetime of the suspicious login event, a user profile associated with the suspicious login event, a network traffic log associated with the suspicious login event, and a running process associated with the suspicious login event.

7. The system of claim 1, wherein presenting the data associated with the detected suspicious login event using the visualization layer includes displaying the data associated with the detected suspicious login event in a statistical data dashboard interface, wherein the presented data is included in statistical data associated with a security state of an associated system.

8. A computerized method comprising:

receiving a first group of security data from a first security data source, wherein the first security data source is an intrusion prevention system (IPS), and the first group of security data includes authentication data;

receiving a second group of security data from a second security data source, wherein the second security data source is a firewall, and the second group of security data includes network flow data;

normalizing the first group of security data and the second group of security data such that the normalized first group of security data and the normalized second group of security data are compatible with a model trained predicting a future security event; wherein the normalizing includes:

adjusting a scale of event data of the authentication data such that the event data of the authentication data and event data of the network flow data are of a same scale; and synchronizing the event data of the authentication data and the event data of the network flow data with respect to time;

predicting the future security event using the model, the normalized first group of security data, and the normalized second group of security data; and presenting data associated with the predicted future security event using a visualization layer.

9. The computerized method of claim 8, wherein the first group of security data and the second group of security data are received using data interfaces including one or more of the following: application programming interfaces (APIs) associated with security data sources, connector interfaces, and data streaming interfaces.

10. The computerized method of claim 8, wherein normalizing the first group of security data and the second group of security data includes one or more of the following: scaling numerical data values of the first and second groups of security data such that the scaled data values are of similar scales and generating new data features based on categorical data values of the first and second groups of security data such that the new data features can be used with the model.

11. The computerized method of claim 8, wherein the predicted future security event includes one or more of: abnormal behavior associated with a user profile, a detected intrusion over an external network connection, and abnormal behavior by a running process.

12. The computerized method of claim 8, further comprising:

obtaining training data including training data instances with past data from the first and the second security data sources and associated indicators of occurrences of security events;

providing the past data from the first and the second security data sources to the model as input;

determining feedback data indicating accuracy of the model using output of the model and the associated indicators of occurrences of security events; and adjusting parameters of the model using the determined feedback data thereby improving accuracy of the model at predicting future security events.

13. The computerized method of claim 8, wherein presenting the data associated with the predicted future security event using the visualization layer includes displaying the data associated with the predicted future security event in a notification interface, wherein the presented data includes one or more of the following: a predicted datetime of the predicted future security event, a predicted user profile associated with the predicted future security event, a network vulnerability associated with the predicted future security event, and a running process associated with the predicted future security event.

14. The computerized method of claim 8, wherein presenting the data associated with the predicted future security event using the visualization layer includes displaying the data associated with the predicted future security event in a statistical data dashboard interface, wherein the presented data is included in statistical data associated with a security state of an associated system.

15. One or more non-transitory computer readable storage media having computer-executable instructions that, upon execution by a processor, cause the processor to at least:

receive a first group of security data from a first security data source, wherein the first security data source is an intrusion prevention system (IPS), and the first group of security data includes authentication data;

receive a second group of security data from a second security data source, wherein the second security data source is a firewall, and the second group of security data includes network flow data;

normalize the first group of security data and the second group of security data such that the normalized first group of security data and the normalized second group of security data are compatible with a model trained for predicting a future security event; wherein the normalizing includes:

adjusting a scale of event data of the authentication data such that the event data of the authentication data and event data of the network flow data are of a same scale; and synchronizing the event data of the authentication data and the event data of the network flow data with respect to time;

detect an anomalous event associated with the predicted future security event using the model, the normalized first group of security data, and the normalized second group of security data; and perform a remedial operation in response to the detected anomalous event.

16. The one or more non-transitory computer readable storage media of claim 15, wherein the first group of security data and the second group of security data are received using data interfaces including one or more of the following: application programming interfaces (APIs) associated with security data sources, connector interfaces, and data streaming interfaces.

17. The one or more non-transitory computer readable storage media of claim 15, wherein normalizing the first group of security data and the second group of security data includes one or more of the following: scaling numerical data values of the first and second groups of security data such that the scaled data values are of similar scales and generating new data features based on categorical data values of the first and second groups of security data such that the new data features can be used with the model.

18. The one or more non-transitory computer readable storage media of claim 15, wherein the anomalous event includes one or more of: abnormal behavior associated with a user profile, a detected intrusion over an external network connection, and abnormal behavior by a running process.

19. The one or more non-transitory computer readable storage media of claim 15, wherein the computer-executable instructions, upon execution by a processor, further cause the processor to at least:

obtain training data including training data instances with past data from the first and the second security data sources and associated indicators of occurrences of anomalous events;

provide the past data from the first and the second security data sources to the model as input;

determine feedback data indicating accuracy of the model using output of the model and the associated indicators of occurrences of anomalous events; and adjust parameters of the model using the determined feedback data thereby improving accuracy of the model at detecting anomalous events.

20. The one or more non-transitory computer readable storage media of claim 15, wherein performing a remedial operation in response to the detected anomalous event includes one or more of the following: blocking network traffic associated with the anomalous event, revoking access privileges of a user profile associated with the anomalous event, and halting a running process associated with the anomalous event.

* * * * *